Patented Aug. 14, 1945

2,381,907

UNITED STATES PATENT OFFICE 2,381,907

MINERAL OIL BENEFICIATION

Everett C. Hughes and Warner E. Scovill, Cleveland Heights, Ohio, assignors to The Standard Oil Company, Cleveland, Ohio, a corporation of Ohio No Drawing. Application December 21, 1940, Serial No. 371,134

4 Claims. (Cl. 252—48)

This invention relates to mineral oils, and more particularly beneficiation or improvement thereof; and it is among the objects of the invention to provide better operating characteristics than are obtained with the oil per se. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Olefins of less than sixteen carbon atoms, and preferably olefins of normally gaseous character, are polymerized, as by halide catalysts, for instance preferably boron fluoride applied at high pressure, e. g. 300 pounds per square inch. The polymerized olefin is of oily consistency, the viscosity depending upon the particular olefin which is polymerized, and the extent of the polymerization treatment. Thus, a varied range of material may be provided. The polymerized olefin is treated with a phosphorus sulphide, e. g. pentasulphide in amount desired, such as up to 40 per cent, and preferably 20 per cent, at a temperature of 200–450° F., and preferably 350° F. The time of reaction may be up to ten hours for instance, and preferably is around six hours for a particularly satisfactory product. Where desired, the polymer may be diluted with a mineral oil before the treatment with the phosphorus sulphide.

The reaction product may be freed from such residue as present finally, by settling or centrifuging; and dilution with mineral oil, for instance an equal volume, is advantageous in such action. And where desired a treatment by sulphuric acid or clay, or both, may be applied. The reaction product is added in desired amount to mineral oils for use; for instance the amount added may be from 0.1 to about 10 per cent of the oil, and the mineral oil may be of a character suitable for the usage in view, and for instance may be of 40–200 sec. Saybolt Universal at 210° F.

As indicated, the polymerized olefin may be of such character and degree of polymerization as preferred in any given instance. If high polymers are employed, the reaction product on incorporation with a mineral oil, results not only in increased durability and preservation of body, but also a V. I. improvement.

As an example: Polypropylene, obtained for instance by reacting propylene with boron fluoride at 300 pounds per square inch pressure and 0° C., is heated at 350° F. with 20 per cent by weight of phosphorus pentasulphide for six hours. After separating it from sludgy material as necessary, this product is added in amount of 0.5 per cent by weight to an S. A. E. 20 lubricating oil of Mid-Continent source. This oil, tested by accelerated test at a temperature of 310° F. in contact with metal and with air blown through at the rate of 30 liters per hour for 65 hours, showed viscosity increase 119 sec. Saybolt Universal at 100° F., naphtha insolubles 0.6 per cent, lacquer formation 18.2 mg., and appearance rating B. In contrast, the lubricating oil without the addition agent showed a viscosity increase of 362, naphtha insolubles 4.1 per cent, lacquer formation 87.4 mg., and appearance rating C minus.

The reaction product of phosphorus pentasulphide with polypropylene may be used advantageously also as a cutting oil ingredient. Thus for instance it may be added in amount up to about 20 per cent, preferably about 10 per cent, to a mineral oil, as an oil having a viscosity of 100 sec. Saybolt at 100° F. Such cutting oils are particularly light and transparent.

Other modes of applying the principle of the invention may be employed, change being made as regards the details described, provided the features stated in any of the following claims, or the equivalent of such, be employed.

We therefore particularly point out and distinctly claim as our invention:

1. A lubricating oil comprising a mineral oil and a small amount of the reaction product of polymerized propylene with phosphorus pentasulphide, the latter being the primary ingredient reacting with the polymerized propylene.

2. A lubricating oil comprising a mineral oil and a small amount of the reaction product of a polymer formed from an olefin of less than 16 carbon atoms with phosphorus pentasulphide, the latter being the primary ingredient reacting with the polymer.

3. A lubricating oil comprising a mineral oil and a small amount of the reaction product of polymerized propylene with a phosphorus sulphide, the latter being the primary ingredient reacting with the polymerized propylene.

4. A lubricating oil comprising a mineral oil and a small amount of the reaction product of a polymer formed from an olefin of less than 16 carbon atoms with a phosphorus sulphide, the latter being the primary ingredient reacting with the polymer.

EVERETT C. HUGHES.
WARNER E. SCOVILL.